United States Patent
Giardino et al.

(10) Patent No.: US 9,107,448 B2
(45) Date of Patent: Aug. 18, 2015

(54) METHOD FOR CARBONATING A BEVERAGE

(71) Applicant: CORNELIUS, INC., St. Paul, MN (US)

(72) Inventors: Nicholas Giardino, Gilberts, IL (US); David K. Njaastad, Palatine, IL (US)

(73) Assignee: Cornelius, Inc., St. Paul, MN (US)

(*) Notice: Subject to any disclaimer, the term of this patent is extended or adjusted under 35 U.S.C. 154(b) by 0 days.

(21) Appl. No.: 13/908,847

(22) Filed: Jun. 3, 2013

(65) Prior Publication Data

US 2014/0356491 A1    Dec. 4, 2014

(51) Int. Cl.
 *A23L 2/54*    (2006.01)

(52) U.S. Cl.
 CPC .................................. *A23L 2/54* (2013.01)

(58) Field of Classification Search
 CPC ........ A23V 2250/11; A23L 2/40; A23L 2/54; B01F 3/04794; B01F 3/04801; B01F 3/04808; B01F 3/04815; B01F 3/04106; B01F 3/04439; B01F 3/04978; B57D 1/0057; B57D 1/0058; B57D 1/0059; B57D 1/006; B57D 1/0071; B57D 1/0074; B57D 1/0075; B57D 1/0406; B57D 1/0425
 USPC .................................................. 426/477, 474
 See application file for complete search history.

(56) References Cited

U.S. PATENT DOCUMENTS

| | | | |
|---|---|---|---|
| 1,561,036 A | 11/1925 | Sugden | |
| 1,960,640 A | 5/1934 | Lajeunesse | |
| 2,006,313 A * | 6/1935 | Geddes | 99/323.2 |
| 2,556,038 A | 6/1951 | Kollsman | |
| 4,208,903 A | 6/1980 | Hopper et al. | |
| 4,251,473 A | 2/1981 | Gilbey | |
| 4,323,090 A | 4/1982 | Magi | |
| 4,481,986 A | 11/1984 | Meyers | |
| 4,518,541 A | 5/1985 | Harris | |
| 4,719,056 A | 1/1988 | Scott | |

(Continued)

FOREIGN PATENT DOCUMENTS

| WO | 0187472 | 11/2001 |
|---|---|---|
| WO | 2012162762 | 12/2012 |

OTHER PUBLICATIONS

Fulcher How to Use the SodaStream Jet YouTube Feb. 11, 2012 [retrieved on Feb. 26, 2014] Retrieved from the Internet<URL:http:www.youtube.com/watch?v=bf9MVEel5XM> entire video, (8 pages).

(Continued)

*Primary Examiner* — Anthony Weier
(74) *Attorney, Agent, or Firm* — Andrus Intellectual Property Law, LLP (57) ABSTRACT

The present invention recognizes the need for an apparatus and method for creating carbonated beverages having a customizable carbonation level. The invention uses a CPU to control an inlet valve which connects a tank of pressurized carbon dioxide to a vessel containing the beverage to be carbonized. The tube connecting the tank of pressurized carbon dioxide to the vessel contains an orifice for reducing the carbon dioxide's flow rate, thereby increasing control over the amount of carbon dioxide introduced to the vessel. A motor agitates the vessel, causing the carbon dioxide to become absorbed in the beverage. Then, an outlet valve causes excess pressure to drain from the vessel. An outlet orifice causes the pressure to release gradually, thus preventing the beverage from foaming.

27 Claims, 7 Drawing Sheets

(56) References Cited

U.S. PATENT DOCUMENTS

| | | | |
|---|---|---|---|
| 4,785,973 A | | 11/1988 | Kobe |
| 4,850,269 A | | 7/1989 | Hancock et al. |
| 4,869,396 A | | 9/1989 | Horino et al. |
| 4,940,212 A | | 7/1990 | Burton |
| 4,999,140 A | | 3/1991 | Sutherland et al. |
| 5,118,009 A | | 6/1992 | Novitsky |
| 5,156,871 A | | 10/1992 | Goulet et al. |
| 5,192,513 A | | 3/1993 | Stumphauzer et al. |
| 5,260,081 A | * | 11/1993 | Stumphauzer et al. ........ 426/477 |
| 5,299,715 A | | 4/1994 | Feldman |
| 5,460,846 A | * | 10/1995 | Stumphauzer et al. ........ 426/477 |
| 5,531,254 A | | 7/1996 | Rosenbach |
| 5,549,037 A | * | 8/1996 | Stumphauzer et al. ....... 99/323.1 |
| 5,592,867 A | | 1/1997 | Walsh et al. |
| 6,041,970 A | | 3/2000 | Vogel et al. |
| 6,073,811 A | | 6/2000 | Costea et al. |
| 6,167,718 B1 | * | 1/2001 | Halimi et al. .................... 62/293 |
| 6,439,549 B1 | | 8/2002 | Lööv |
| 6,530,400 B2 | * | 3/2003 | Nelson ................................ 141/2 |
| 7,114,707 B2 | | 10/2006 | Rona et al. |
| 7,267,247 B1 | | 9/2007 | Crunkleton, III et al. |
| 2007/0158371 A1 | | 7/2007 | Lupfer |
| 2010/0096040 A1 | | 4/2010 | Litto |
| 2011/0020508 A1 | * | 1/2011 | Santoiemmo ................. 426/232 |
| 2011/0113972 A1 | * | 5/2011 | Tatera ........................... 99/323.1 |
| 2011/0115103 A1 | * | 5/2011 | Tatera .............................. 261/35 |
| 2011/0180565 A1 | * | 7/2011 | Racino et al. .................... 222/61 |
| 2011/0226343 A1 | | 9/2011 | Novak et al. |
| 2011/0300275 A1 | | 12/2011 | Lackey et al. |
| 2012/0098148 A1 | | 4/2012 | Koslow et al. |
| 2012/0292790 A1 | * | 11/2012 | Tatera .............................. 261/74 |
| 2013/0106690 A1 | | 5/2013 | Lim |
| 2014/0099405 A1 | * | 4/2014 | Boarman et al. ................. 426/67 |
| 2014/0113045 A1 | * | 4/2014 | Njaastad et al. .............. 426/477 |
| 2014/0255574 A1 | | 9/2014 | Njaastad et al. |

OTHER PUBLICATIONS iSi Twist 'N Sparkle Beverage Carbonating System YouTube video [online], isinorthamerica Mar. 23, 2011 [retrieved on Mar. 11, 2014] Retrieved from the Internet: <Url:www.youtube.com/watch?v=ySSXdwTs-cY>, (3 pages).

Perlini Carbonated Cocktail System YouTube video [online] Perlage Systems Jan. 11, 2010 [retrieved on Mar. 3, 2011]Retrieved from the Internet: <URL:www.youtube.com/watch?v=fhle9b4mjC4&feature=relmfu>, (3 pages).

Sodastream video demo [online], [retrieved on Mar. 11, 2014] Retrieved from the Internet: <URL:www.sodastreamusa.com/PopUps/VideoDemo.html>, (1 page).

Sodastream webpage [online], [retrieved on Oct. 8, 2012] Retrieved from the Internet<URL:www.sodastream.com/fizz/>, (1 page).

ISR and Written Opinion for International Patent Application No. PCT/US2013/065763 mailed Mar. 18, 2014, (13 pages).

ISR and Written Opinion for International Patent Application No. PCT/US2014/022048 mailed Jun. 27, 2014, (10 pages).

ISR and Written Opinion for International Patent Application No. PCT/US2014/033040 mailed Aug. 27, 2014, (7 pages).

IPRP for International Patent Application No. PCT/US2013/065763 mailed Sep. 25, 2014 (16 pages).

ISR and Written Opinion for International Patent Application No. PCT/US2014/040509 mailed Oct. 1, 2014 (11 pages).

IPRP for International Patent Application No. PCT/US2014/022048 mailed Feb. 18, 2015 (9 pages).

* cited by examiner

METHOD FOR CARBONATING A BEVERAGE

FIELD OF THE INVENTION

The invention relates to a method and apparatus for carbonation of a liquid, more particularly, to a method and apparatus for creating a carbonated batch of a finished beverage product.

BACKGROUND OF THE INVENTION

Carbonated water is generally formed by introducing a pressurized liquid and pressurized carbon dioxide gas into a carbonator tank. The pressure of the contents of the tank forces the carbon dioxide into the liquid, thus forming a carbonated liquid. Typically such carbonator tanks are bulky, large, and increase the manufacturing cost of a beverage dispensing system.

Current carbonated beverages may be formed by using a carbonator to carbonate a liquid source and then introducing a flavored syrup concentrate to make a carbonated beverage. Additionally, prior art devices may include a small carbon dioxide cartridge that introduces carbonation under pressure into a tank of water and then add the syrup or other ingredients to create a finished beverage.

However, prior art carbonation apparatuses are limited in the amount of carbonation that they introduce to the beverage because they do not agitate the beverage or have the ability to vary the pressure to create various carbonation levels, for example, low, medium and high levels of carbonation. Additionally, typical prior art apparatuses may be utilized to only carbonate a water source and do not carbonate a finished beverage.

There is therefore a need in the art for a method and apparatus that provides reliable levels of carbonation to a beverage on an individual small batch basis such that the carbonation level may be adjusted to various levels.

SUMMARY OF THE INVENTION

The present invention provides a batch carbonation process in which a user introduces a liquid into a vessel, locks the vessel to an agitation mechanism, and selects a level of carbonation. Based on the level of carbonation selected by the user, a CPU operates to open a valve to introduce pressurized carbon dioxide into the vessel. The agitation mechanism operates to place a force on the liquid within the vessel, thus increasing the surface area of the contact between the liquid (which may be partially atomized) and the carbon dioxide gas within the vessel. Furthermore, the invention reduces the rate of flow of the pressurized carbon dioxide gas into the vessel by utilizing an orifice. Using a transducer, the invention measures the pressure of the carbon dioxide gas, and communicates the pressure measurement to the CPU, which adjusts the pressure within the vessel by opening and closing the inlet valve in accordance with the level of carbonation selected by the user until the selected level of carbonation is achieved. The CPU then stops the agitation mechanism upon completion of the carbonation cycle. Additional features of the invention include venting the pressure within the vessel after the desired level of carbonation has been obtained and controlling the rate of flow of the gas exiting the vessel by utilizing an orifice.

A further feature of the invention is controlling the opening and closing of an outlet valve by the CPU upon completion of the carbonation process.

DETAILED DESCRIPTION OF THE PREFERRED EMBODIMENT

Carbonation is the process of dissolving carbon dioxide into a solution of water under pressure. It is commonly used in the creation of soft drinks, tonic water and other carbonated drinks. Effervescence is the escape of gas from an aqueous solution. In many consumer products, such as soft drinks, for example, Coca-Cola, 7-Up and Pepsi, carbonation (more particularly, the effervescence of the escaping gas) enhances the flavor of the beverage. Carbonated beverages contain dissolved carbon dioxide. The process of dissolving carbon dioxide ($CO_2$) in water is called carbonation. Carbonation may occur naturally from fermentation or a mineral source. However, most carbonated soft drinks are carbonated utilizing carbon dioxide which is artificially added to the beverage. Artificial carbonation is typically performed by dissolving carbon dioxide under pressure into a liquid.

This invention can be used for carbonation of a liquid inside a vessel. The liquid is not carbonated when it is placed in the vessel. Carbonation occurs through a process in which carbon dioxide is introduced into the vessel containing a liquid. The amount of carbon dioxide absorbed by the liquid is controlled by the rate with which the carbon dioxide is introduced in the vessel. The user thus has the option to create beverages having varying levels of carbonation to satisfy the palate of the consumer. This invention can be used with various liquids, such as juices, water, cola drinks, or other beverages. The present invention focuses on customizing the level of carbonation in a liquid to satisfy a customer's taste.

Figure 1:
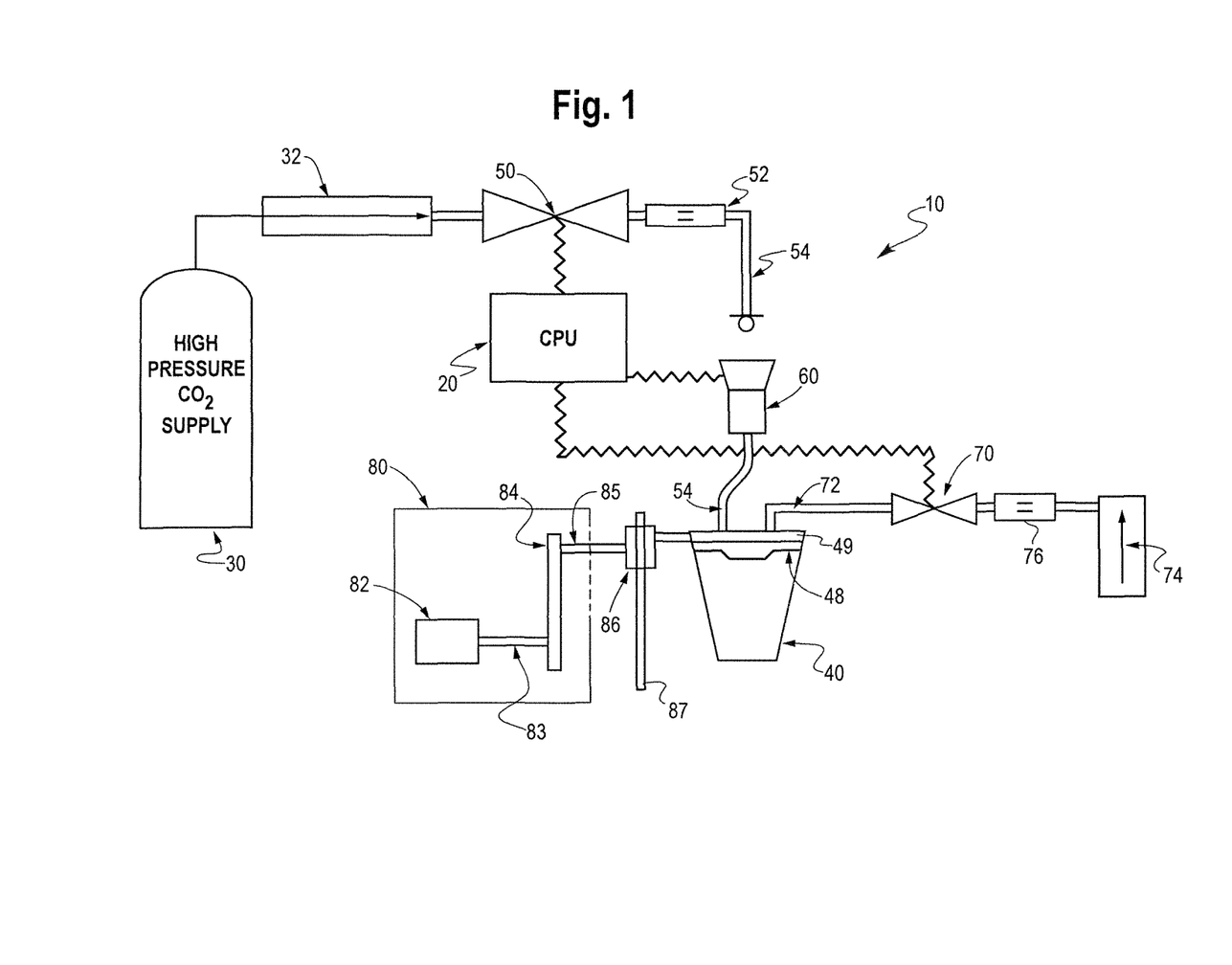
FIG. 1 is a schematic of the carbonation process.

Referring to FIG. 1, there is shown the apparatus 10 used for preparing the batch carbonation of various liquids. The process is controlled by a Central Processing Unit ("CPU") 20 that controls an inlet valve 50 and an outlet valve 70. The CPU 20 receives input data from a transducer 60 which monitors the pressure in the inlet flow line 54. The CPU 20 is preprogrammed to recognize the various pressure readings obtained from the transducer 60 and acts accordingly to open and/or close the inlet valve 50, which may be a solenoid type valve or other valve, to control the level of carbon dioxide gas introduced into the vessel 40. The CPU 20 further operates to activate the agitation mechanism 80 upon starting the system. Additionally, the CPU 20 operates to open the outlet valve 70 upon completion of the carbonation process.

Figure 2:
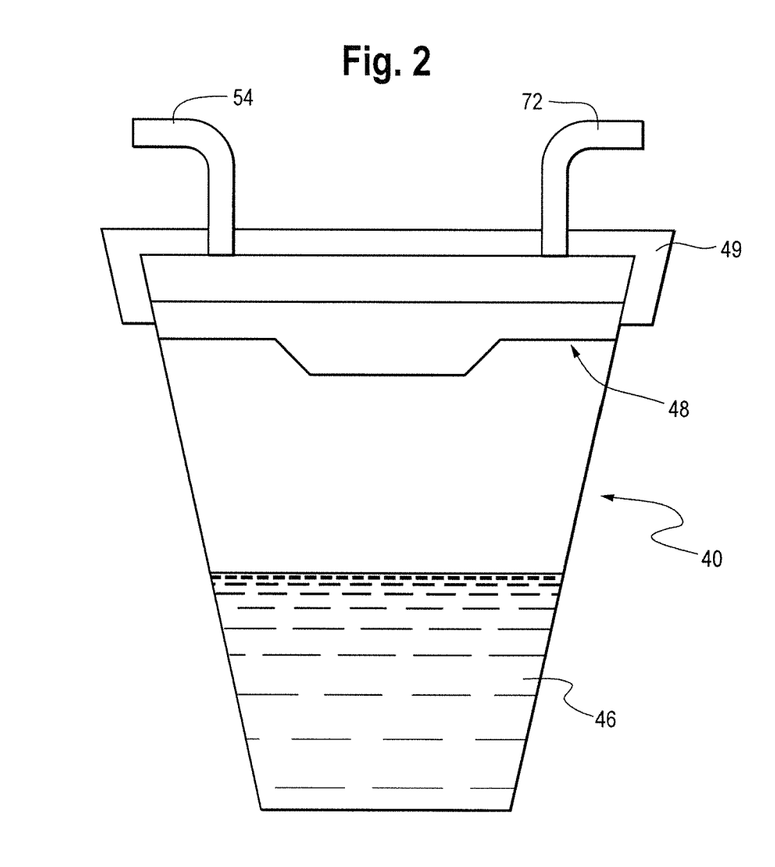
FIG. 2 is a cross-section of the pressure mixing vessel.

As seen in FIG. 2, the invention utilizes a vessel 40 into which an operator may introduce a liquid 46. It is preferable that the vessel 40 be made of stainless steel. However, it could be made of other material provided that the material is sufficient to withstand pressure as high as 100 pounds per square inch ("PSI") during the carbonation process. The user may enter a desired volume of liquid 46 into the vessel 40, provided that there is at least some empty space in the vessel 40 which allows mixing of the liquid with the carbon dioxide. The optimal ratio between empty space (i.e. air) and liquid 46 within the vessel 40 is two-thirds volume of liquid and onethird volume of empty space. However, this ratio can be varied from as low as 5% air space above the liquid to as high as 95% air space above the liquid volume. Regardless of the ratio of liquid 46 to empty space in the vessel 40, the liquid 46 in the vessel 40 will carbonate to some level. A higher ratio of empty air space to liquid volume results in a greater rate of carbonation of the liquid 46. The inverse is true for a lower ratio of air to liquid 46 in the vessel 40. Moreover, it is preferable to introduce liquid 46 at a temperature below 40° F. to help effectuate the carbonation process or, alternatively introduce ice into the vessel 40 along with the liquid 46 to reduce the temperature of the liquid.

The vessel 40 may also contain a seal 48. The user may select a level of carbonation on the user input interface (not shown) which communicates the selected level to the CPU 20. The same may be done with the volume of liquid the user placed in the vessel 40.

Within the housing (not shown) of the batch carbonation mechanism, there is a chamber to receive the vessel 40. The chamber includes a locking mechanism 49 which seals and locks the vessel 40 into place within the housing. The housing contains an agitation mechanism 80. The agitation mechanism 80 comprises a motor 82 which turns a shaft 83. The shaft 83 operates to rotate a cam 84 having a linkage 85. Rotation of the cam 84 operates to move linkage 85 up and down. The linkage 85 is connected to a platform 86 to which the locking mechanism 49 is fixed. The platform 86 moves up and down along a guide rail 87 in response to rotation of the motor 82. In this configuration, the platform 86 moves up and down along the guide rail 87. Since the platform 86 holds the vessel 40, the vessel 40 also moves up and down along the guide rail 87. The vessel 40 moves in a reciprocal manner to a maximum upward position and a minimum downward position along the guide rail 87. While the preferred embodiment demonstrates the movement of the vessel 40 in an upper and lower maximum position, other agitation configurations may be utilized such as, by way of example, rotation, oscillation and/or horizontal reciprocal movement.

One aspect of the invention recognizes that a significant jolting force should be placed upon the liquid 46 contained in the vessel 40 when the vessel 40 reaches its maximum upward and minimum downward positions. The strong force created by the sudden change in direction of the movement of the vessel 40, for example, from an upward movement to a downward movement at the maximum upward position of the vessel 40, causes a jolting force to be applied to the liquid 46 within the vessel 40. The effect of the jolting force acting upon the liquid 46 is that a portion of the liquid 46 within the vessel 40 will atomize. During atomization, the liquid 46 is suspended within the carbon dioxide gas to increase the surface area of the contact between the carbon dioxide gas and the suspended liquid. The greater surface area between the carbon dioxide and the liquid 46 causes a greater carbonation level. This is because the atomized liquid has a different pressure than the carbon dioxide, which causes the carbon dioxide to be absorbed into the liquid 46, thus forming a carbonated liquid having a specified volume of carbonation. In order to sufficiently atomize the liquid 46 within the vessel 40, a force of 3 gravitational units (g) or greater should be placed upon the liquid 46 within the vessel 40. It has been found that the optimal force to atomize the liquid 46 is approximately 6 G force units applied at the two extremes of the movement of agitation mechanism 80.

The locking mechanism 49 of the vessel 40 includes an inlet flow line 54 and outlet flow line 72. The inlet flow line 54 introduces carbon dioxide into the vessel 40. The outlet flow line 72 permits excess pressure or carbon dioxide to exit the vessel 40 upon completion of the carbonation process. The inlet flow line 54 is connected to a high pressure carbon dioxide supply 30. The high pressure carbon dioxide supply 30 has a regulator 32 which reduces the pressure of the carbon dioxide exiting the regulator 32 to approximately 100 PSI. The high pressure carbon dioxide supply 30 and regulator 32 are controlled by an inlet valve 50 which may open and close. The inlet valve 50 is opened and closed based upon input from the CPU 20. The CPU 20 receives input from the transducer 60 which supplies a reading of the pressure within the inlet flow line 54. The pressure in the inlet flow line 54 is the same as the pressure within the vessel 40. The CPU 20 is programmed to read the pressure within the inlet flow line 54 and determines the amount of carbon dioxide that needs to be introduced into the vessel 40. The CPU 20 will open inlet valve 50 until a predetermined pressure is achieved in the vessel 40. The pressure is measured by the transducer 60. As the inlet valve 50 opens, the pressure within the vessel 40 increases to the predetermined pressure stored in the CPU 20. The apparatus functions as a closed loop control, wherein the transducer 60 provides feedback to the CPU 20 regarding the current pressure level within the inlet flow line 54, which is approximately the same pressure as in the vessel 40. The vessel 40 is brought to a predetermined pressure setting based on a desired carbonation level. The closed loop then maintains the predetermined pressure within the vessel 40 as the liquid 46 within the vessel 40 is being agitated by the agitation mechanism 80.

As the liquid 46 within the vessel 40 is agitated, the liquid 46 becomes atomized, or partially reduced to droplet form, and absorbs the carbon dioxide into the liquid 46. The pressure within the vessel 40 drops as the carbon dioxide is absorbed into the liquid 46. The CPU 20 detects when the pressure in the vessel has dropped below a certain level and opens inlet valve 50 to reintroduce carbon dioxide into the vessel 40. In this way, the CPU 20 can maintain a constant pressure within the vessel 40. This process is continued until the liquid 46 becomes saturated with carbon dioxide.

Figure 4:
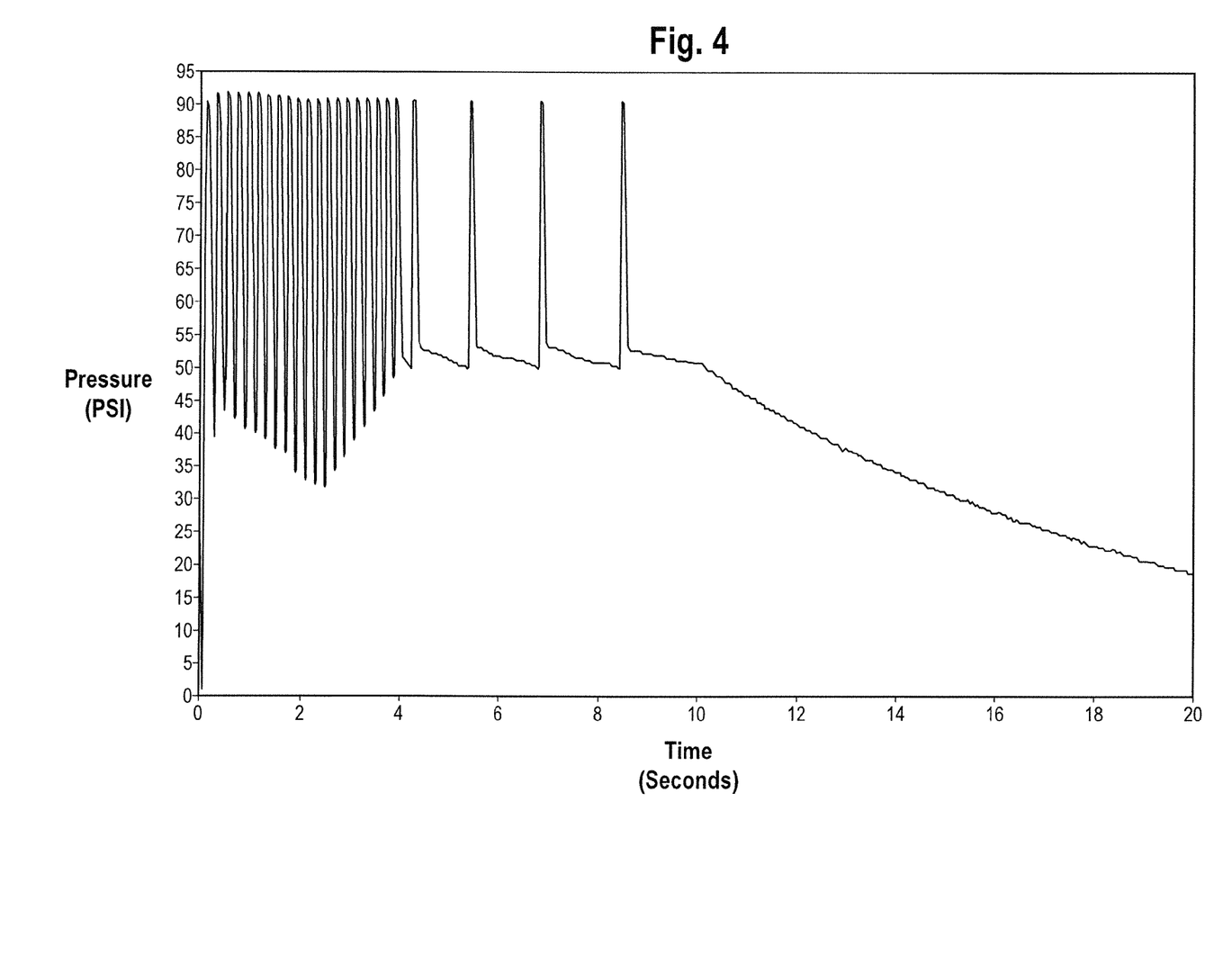
FIG. 4 is an exemplary chart of the carbonation cycles.

A problem faced in the development of the present invention is the fact that pressurized carbon dioxide moves through the tubing and into the vessel 40 so quickly that the regulator 32, inlet valve 50, and CPU 20 cannot provide meaningful regulation of the flow of carbon dioxide. In other words, the carbon dioxide flows so fast that the vessel 40 receives a high amount of carbon dioxide even when the regulator 32, inlet valve 50, and CPU 20 are configured to introduce only a low amount of carbon dioxide. An example of this problem is shown in FIG. 4, which shows pressure as measured by the transducer 60 during operation of the agitation mechanism 80 after the inlet valve 50 has been opened to introduce pressurized carbon dioxide gas into the vessel 40. The chart of FIG. 4 shows the pressure in the vessel 40 as a function of time, in an exemplary scenario in which the agitation mechanism 80 is activated, and pressurized carbon dioxide is being introduced through inlet valve 50. As can been seen, the slope of the rate of increase of carbon dioxide into the vessel 40 is extremely high, which means, in essence, that the carbon dioxide is absorbed into the liquid 46 at a faster rate than the CPU 20 can react to close inlet valve 50. The graph depicts the increase in pressure within the vessel from 0 PSI to 90 PSI within approximately ⅕ of a second. This rapid increase in pressure cannot be conveyed to the CPU 20 by the transducer 60 in such a short amount of time. Nor can the CPU 20 signal to close the inlet valve 50 in such a small time increment. What occurs is that the carbon dioxide is rapidly absorbed into the liquid as depicted in FIG. 4. The CPU 20 cannot signal the valve 50 to close until after the liquid 46 has already become full saturated with carbon dioxide. In essence, the liquid 46 reaches a saturation point of carbon dioxide very rapidly, i.e. within fractions of a second. The device cannot be operated to carbonate the liquid 46 to lower saturation levels other than maximum saturation. The present invention solves this problem by slowing down the flow rate of carbon dioxide, thereby allowing the regulator 32, inlet valve 50, and CPU 20 sufficient time to control the carbon dioxide.

To solve the problem, an inlet orifice 52 may be positioned within the inlet flow line 54 or inlet valve 50 to reduce the slow rate of the carbon dioxide gas. The inlet orifice 52 reduces the flow rate of the high pressure carbon dioxide supply 30 into the vessel 40. The optimal range for the flow coefficient ($C_v$) is between 0.004 and 0.022. Other flow rates could be used depending on carbonation levels desired and how fast the CPU 40 could react to rapid changes in carbon dioxide pressure changes.

Figure 3:
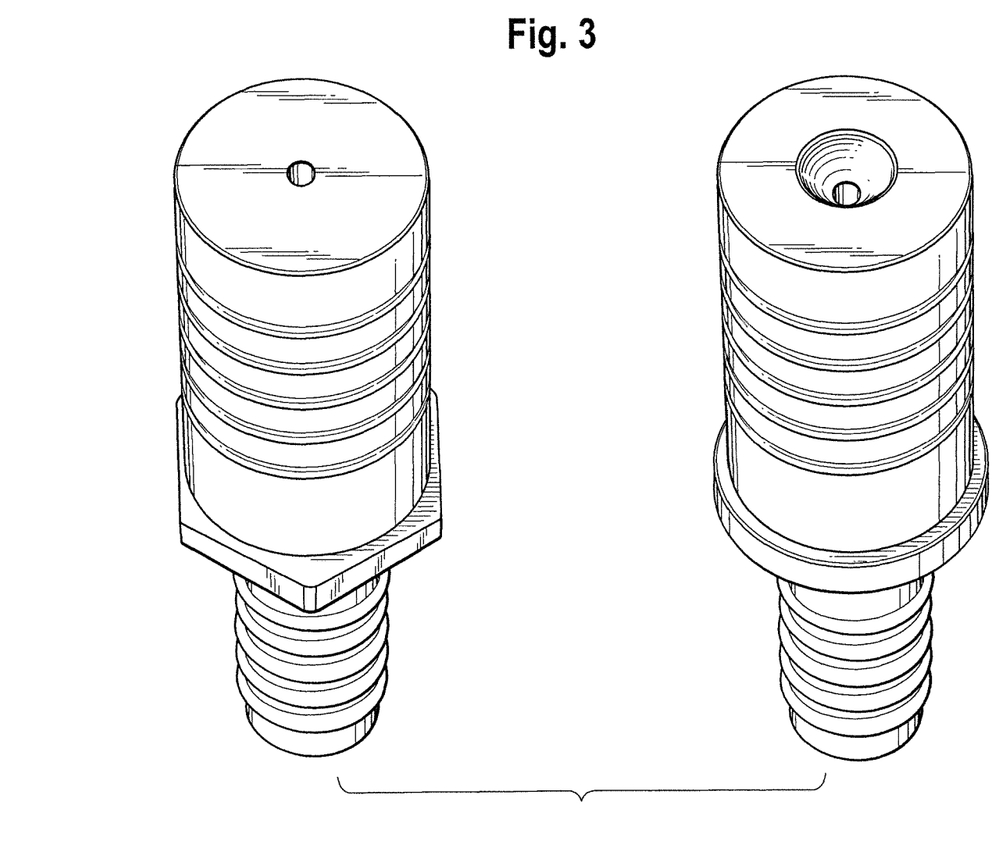
FIG. 3 is a perspective view of the types of orifices used as part of the invention.

The inlet orifice 52 slows down the rate of flow of the carbon dioxide gas entering the vessel 40. An example of the inlet orifice 52 can be seen in FIG. 3. Any size orifice can be used, however, it is preferred that the orifice be between 0.03 inches to 0.05 inches and positioned within a ⅜ inch diameter tubing. Referring back to FIG. 1, the inlet orifice 52 may be positioned anywhere along the inlet flow line 54 between the regulator 32 and the transducer 60. It may also be incorporated into inlet valve 50. The inlet orifice 52 creates a pressure drop within the inlet flow line 54 which slows the flow rate of the carbon dioxide gas through the inlet flow line 54. The reduction in the flow rate of the carbon dioxide gas into the vessel 40 permits the transducer 60 sufficient time to send the appropriate signal to the CPU 20 such that the CPU 20 has sufficient time to close inlet valve 50 prior to the liquid 46 becoming completely saturated with the carbon dioxide. The process of varying the rate of introduction of carbon dioxide into the vessel 40 allows for the ability to control the level of carbonation of the liquid 46 in the vessel 40. By slowing the rate in which carbon dioxide flows through inlet flow line 54 provides enough time for the CPU 20 to read the different pressure measurements from the transducer 60 and react to the readings by either opening or closing inlet valve 50. This allows for the formation of beverages that have differing carbonation levels.

Figure 5:
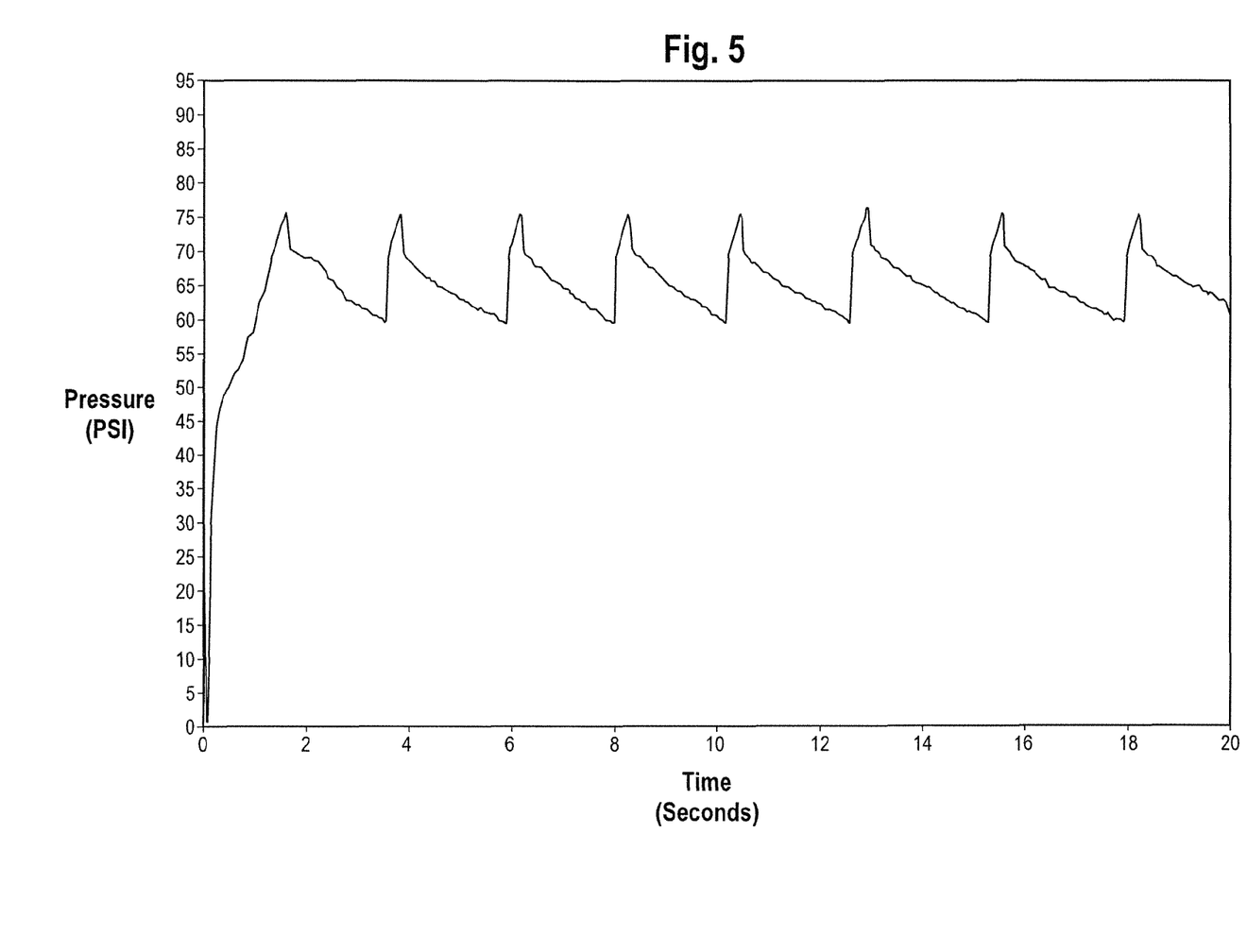
FIG. 5 is an example of a low carbonation drink cycle.

The effect of a lower flow rate on the level of carbonation can be seen in FIG. 5. FIG. 5 depicts a graph of the pressure measurements versus time the inlet valve 50 is opened and after carbon dioxide has been introduced into the vessel 40 and the agitation mechanism 80 has started operating at a mid-level carbonation. The inlet orifice 52 allows for a slower rate of introduction of the carbon dioxide gas into the vessel 40. As can be seen in FIG. 5, when using the inlet orifice 52, it takes two seconds for the pressure in the vessel 40 to reach 75 PSI. This is much slower than the fractions of a second it took for the pressure within the vessel 40 to reach 90 PSI without the inlet orifice 52 as shown in FIG. 4. The CPU 20, as can be seen in FIGS. 1 and 5, receives a signal from the transducer 60 that a pressure of 75 PSI has been reached within the vessel 40. The CPU 20 is programmed to close the inlet valve 50 upon receiving a signal that the transducer 60 has obtained a reading of 75 PSI. This permits the carbon dioxide gas to be absorbed into the liquid 46 as it is agitated within the vessel 40. As the carbon dioxide is absorbed into the liquid 46, the pressure within the vessel 40 drops. When the pressure within the vessel 40 reaches a pre-determined value, such as 60 PSI in FIG. 5, the transducer 60 sends a signal to the CPU 20 that a pressure measurement of 60 PSI has been obtained. The CPU 20 then operates to open inlet valve 50 to allow pressurized carbon dioxide to enter the vessel 40. As with the initial process, once a pressure of 75 PSI is read by transducer 60 and sent to CPU 20, the inlet valve 50 is closed. Once again, as the liquid 46 within the vessel 40 is agitated, the carbon dioxide is absorbed within the liquid 46 and the pressure within the vessel 40 drops. This process continues until a stabilized condition is reached wherein the liquid 46 has reached a mid-range of carbonation. At this time, the CPU 20 activates outlet valve 70 to release excess pressure.

Figure 6:
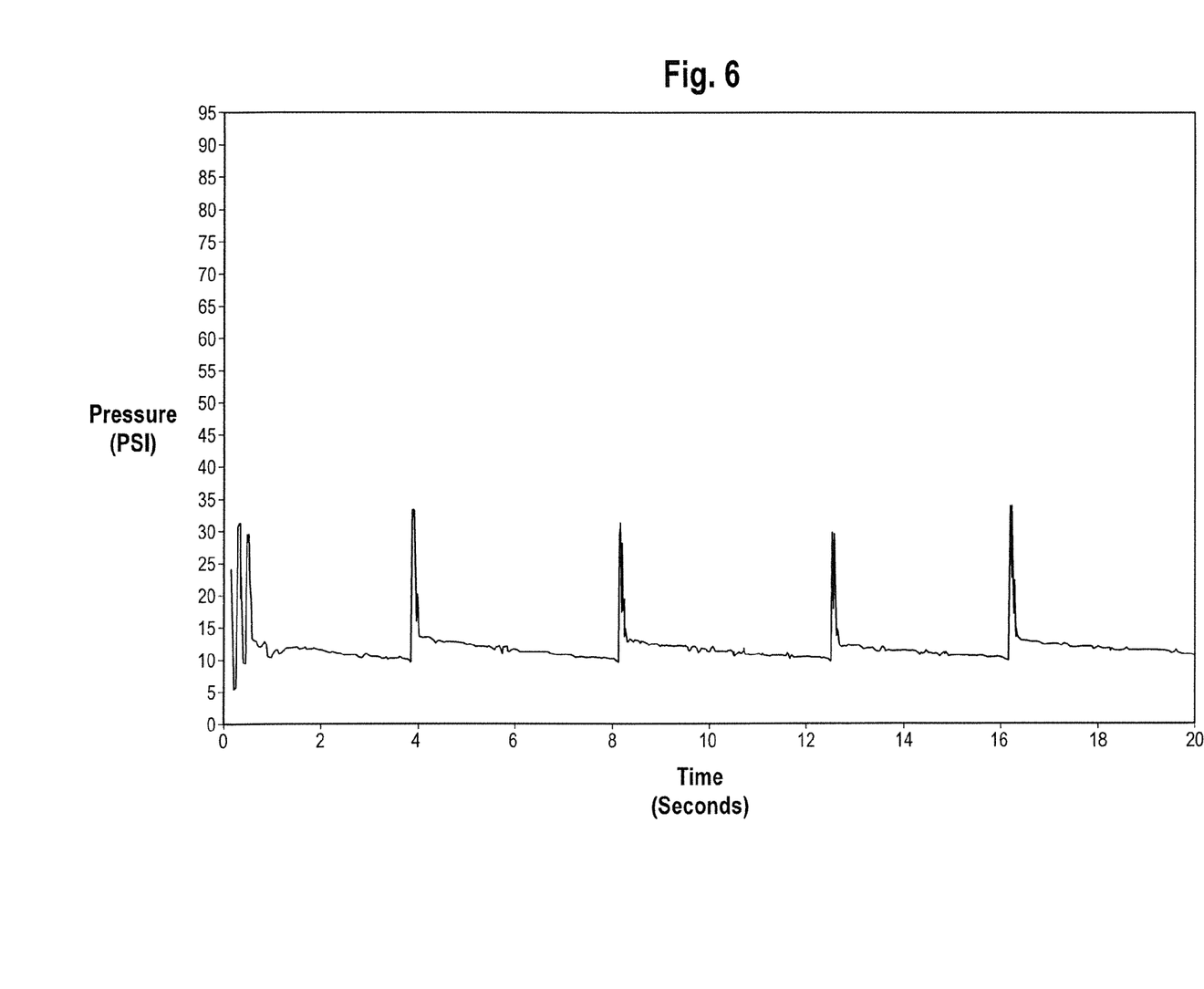
FIG. 6 is an example of a middle carbonation drink cycle.

An example of the pressure measurements for a low level carbonated drink is depicted in FIG. 6. The inlet orifice 52 allows for a slower rate of introduction of the carbon dioxide gas into the vessel 40. As can be seen, it takes four seconds to reach a pressure of 35 PSI in the vessel 40. This is much slower than the fractions of a second it took for the pressure within the vessel 40 to reach 90 PSI without the inlet orifice 52 as shown in FIG. 4. The CPU 20, as can be seen in FIGS. 1 and 6, receives a signal from the transducer 60 that a pressure of 35 PSI has been reached within the vessel 40. The CPU 20 is programmed to close the inlet valve 50 upon receiving a signal that the transducer 60 has obtained a reading of 35 PSI. This permits the carbon dioxide gas to be absorbed into the liquid 46 as the liquid 46 is agitated within the vessel 40. As the carbon dioxide is absorbed into the liquid 46, the pressure within the vessel 40 drops. When the pressure within the vessel 40 reaches a pre-determined value, such as 10 PSI in FIG. 6, the transducer 60 sends a signal to the CPU 20 that a pressure measurement of 10 PSI has been obtained. The CPU 20 then operates to open inlet valve 50 to allow pressurized carbon dioxide to enter the vessel 40. As with the initial process, once a pressure of 35 PSI is read by transducer 60 and sent to CPU 20, the inlet valve 50 is closed. Once again, as the liquid 46 within the vessel 40 is agitated, the carbon dioxide is absorbed within the liquid 46 and the pressure within the vessel 40 drops. This process continues until a stabilized condition is reached wherein the liquid 46 has reached a low-range of carbonation. The inlet orifice 52 reduces the flow rate of carbon dioxide into the vessel 40 such that an actual measurement of the pressure can be read.

The step of introducing carbon dioxide into the vessel 40 may include actuating the inlet valve 50 having a differing pressure, closing an outlet valve 70, wherein actuation of the pressure valve toggles a display on the housing indicating pressure is being introduced into the pressure vessel 18.

The CPU 20 also controls whether the outlet valve 70 is open or closed. The outlet valve 70 is opened after a carbonation cycle has been completed. Once the carbonation cycle is completed, the high pressure carbon dioxide supply 30 is shut off by closing inlet valve 50 by the CPU 20. The carbon dioxide gas is then vented through outlet flow line 72 through an open pressure vent 74. The outlet valve 70 is open when the carbonation cycle is complete to release pressure within the vessel 40. One problem faced by opening the outlet valve 70 was that the carbonated liquid 46 would foam upon the immediate release of pressure within the vessel 40. Utilizing an outlet orifice 76 along outlet flow line 72 prevents a sharp pressure drop within the vessel 40 upon opening of the outlet valve 70, thus preventing foaming and the loss of a majority of the carbon dioxide from the liquid 46. Without outlet orifice 76, the pressure would be released at a high rate, thereby decreasing the level of carbon dioxide contained within the liquid 46. The outlet orifice 76 slows down the rate of flow of the gas exiting the vessel 40. An example of the orifice 76 can be seen in FIG. 3. Any size orifice can be used, however, it is preferred that an orifice is between 0.03 of an inch to 0.05 of an inch within a ⅜ inch diameter tubing. Referring back to FIG. 1, the outlet flow line 72 may include an open pressure vent 74. The outlet orifice 76 creates a pressure drop within the line which slows the flow rate of the gas through the line.

As stated above, the liquid beverage may include a finished beverage product that includes water and additional flavoring ingredients such as coffee. The batch carbonation method of forming a carbonated beverage in a batch allows a user to select a desired carbonation level and produce a carbonated beverage from a finished beverage that includes both water and flavoring ingredients. Various liquid beverages may be introduced and are limited only by the beverage having a high enough percentage of water and low enough viscosity to allow a carbonation process to occur.

Figure 7:
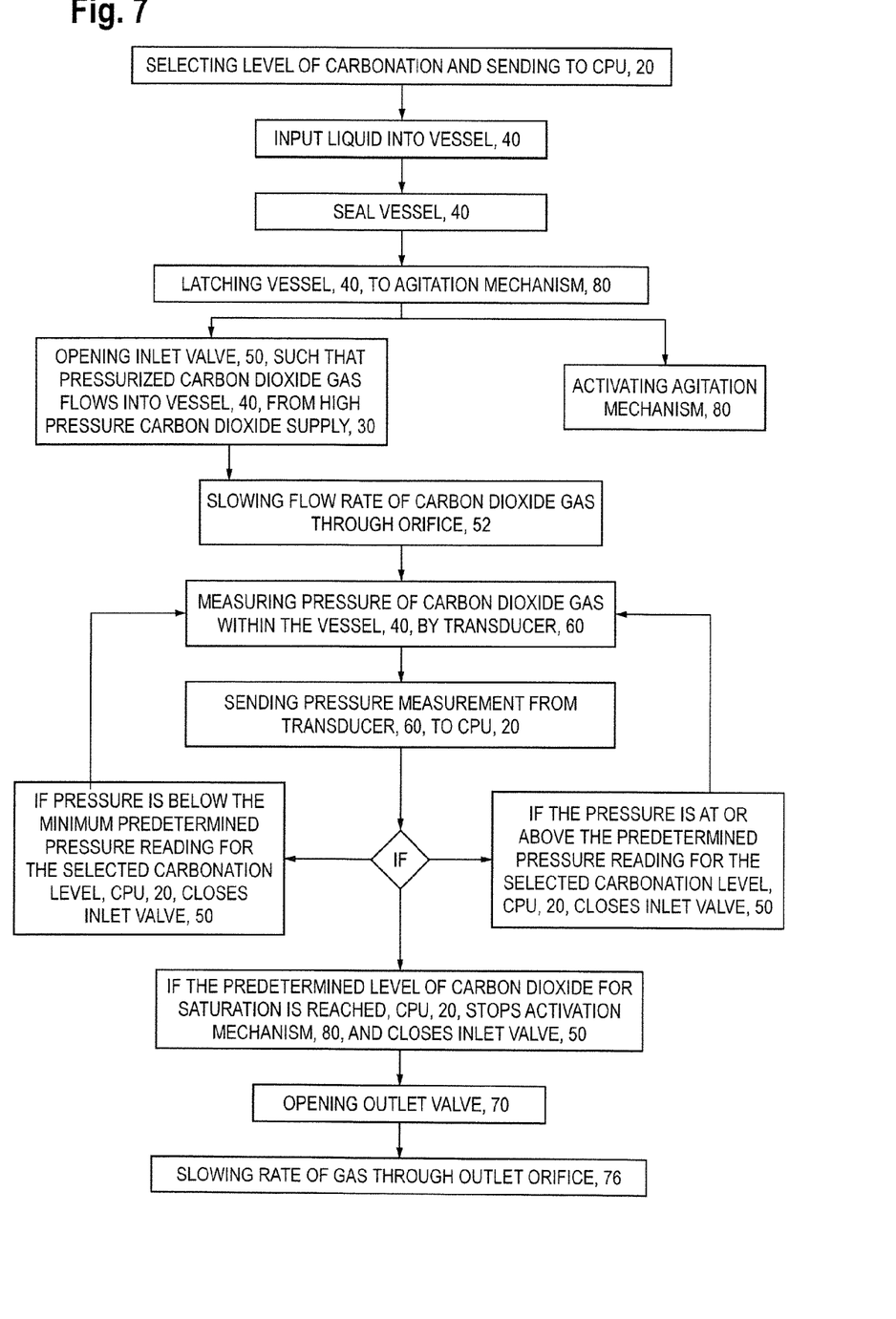
FIG. 7 is a detailed flow chart of the steps in the batch carbonation process.

A short description for the process of carbonating a liquid in the batch carbonation mechanism may prove helpful. Referring to FIG. 7, a user selects the level of carbonation he or she desires for the completed beverage product. The user inputs the selected carbonation level which is sent to the CPU 20. The user inputs liquid 46 to be carbonated into the vessel 40. The user then seals the vessel 40 and latches the vessel 40 to the platform 86 of the agitation mechanism 80. Once the vessel 40 is latched in place, the CPU 20 activates the agitation mechanism 80 to begin movement of the vessel 40 at which time the liquid 46 begins to atomize within the vessel 40. Upon operation of the device, the CPU 20 opens inlet valve 50 such that carbon dioxide gas from the high pressure carbon dioxide supply 30 proceeds through regulator 32, through inlet flow line 54 and through transducer 60 into the vessel 40. An inlet orifice 52 is positioned in the inlet flow line 54 to slow the flow rate of the carbon dioxide gas by a coefficient of 0.004 to 0.022. The transducer 60 measures the pressure of the carbon dioxide gas in the inlet flow line 54 which approximates the pressure within vessel 40. The CPU 20 works in conjunction with the transducer 60 and inlet valve 50 to create a closed loop system wherein the transducer 60 communicates with the CPU 20 to provide the pressure measurement in the inlet flow line 54. Based on the selected level of carbonation, the CPU 20 continues to hold inlet valve 50 open until the transducer 60 registers the predetermined pressure for the selected carbonation level. Once the transducer 60 registers the predetermined pressure level for a selected carbonation level, the CPU 20 sends a signal to close inlet valve 50. Because the liquid 46 within the vessel 40 is being agitated, the carbon dioxide gas is absorbed within the liquid 46. As the carbonated gas is absorbed within the liquid, the pressure drops within the vessel 40. When the pressure reaches a certain lower limit, the transducer 60 registers the measurement with the CPU 20 which in turn opens the inlet valve 50 to raise the pressure within the vessel 40 until the predetermined pressure is obtained for the selected carbonation level. This procedure continues until the liquid 46 within the vessel 40 stabilizes at the desired carbonation level. At that time, the CPU 20 operates to close inlet valve 50 and ceases operation of the agitation mechanism 80. The outlet valve 70 is open such that the pressure within the vessel reaches ambient pressure. There is an outlet orifice 76 within the outlet flow line 72 which reduces the flow rate of the gas from the vessel 40 thus preventing the liquid 46 from foaming into the outlet flow line 72.

While embodiments of the invention have been described in detail, various modifications and other embodiments thereof may be devised by one skilled in the art without departing from the spirit and scope of the invention, as defined in the appended claims.

The invention claimed is:

1. A method for forming a carbonated beverage, the method comprising:
    receiving a carbonation level selected by a user;
    receiving a vessel containing a fluid to be carbonated;
    using a CPU, a valve, and a transducer to introduce a predetermined level of pressurized carbon dioxide into the vessel, wherein the predetermined level of pressurized carbon dioxide flows through an inlet orifice to control the flow rate of the pressurized carbon dioxide introduced into the vessel;
    agitating, the vessel;
    using the CPU, the valve, and the transducer to maintain said predetermined level of pressurized carbon dioxide in the vessel while agitating the vessel; and
    after the step of agitating the vessel is complete, releasing carbon dioxide through an outlet orifice in an outlet tube that is in communication with the vessel.

2. The method of claim 1, wherein the step of agitating the vessel is performed for a predetermined tune corresponding to the carbonation level selected by the user.

3. The method of claim 1, further comprising receiving a beverage size selected by a user.

4. The method of claim 3, wherein the step of agitating the vessel is performed for a predetermined amount of time corresponding to the beverage size selected by the user.

5. The method of claim 1, wherein the step of agitating the vessel is performed using a motor controlled by the CPU.

6. The method of claim 1, wherein the step of agitating the vessel further comprises the step of using a motor to drive the vessel to a maximum upward position and then to a minimum downward position.

7. The method of claim 6, wherein a force of at least 3 Gs acts on the fluid in the vessel when the vessel changes directions.

8. The method of claim 1, further comprising releasing carbon dioxide through an escape vent.

9. The method of claim 1, wherein the orifice has a flow coefficient between 0.004 and 0.022.

10. The method of claim 1, wherein the CPU has predetermined measurements from the transducer which correspond to different levels of carbonation of the liquid within the vessel, whereby the CPU sends a signal to close the valve based upon the predetermined measurements.

11. The method of claim 10, wherein the selected level of carbonation is low, medium or high.

12. The method of claim 11, wherein the selected level of low carbonation, the CPU, transducer and valve operate to maintain the pressure within the vessel between 10 to 40 PSI.

13. The method of claim 12, wherein the selected level of low carbonation, the CPU, transducer and valve operate to maintain the pressure within the vessel to approximately 35 PSI.

14. The method of claim 11, wherein the selected level of medium carbonation, the CPU, transducer and valve operate to maintain the pressure within the vessel between 55 to 80 PSI.

15. The method of claim 14, wherein the selected level of medium carbonation, the CPU, transducer and valve operate to maintain the pressure within the vessel to approximately 75 PSI.

16. The method of claim 11, wherein the selected level of high carbonation, the CPU, transducer and valve operate to maintain the pressure within the vessel between 60 to 90 PSI.

17. The method of claim 16, wherein the selected level of high carbonation, the CPU, transducer and valve operate to maintain the pressure within the vessel to approximately 90 PSI.

18. The method of claim 1, wherein the agitation mechanism provides between 3 Gs and 6 Gs of force on the vessel.

19. The method of claim 1, wherein the agitation mechanism provides approximately 6 Gs of force on the vessel.

20. A method for forming a carbonated beverage in a batch comprising:
    providing, an agitation mechanism;
    providing, a vessel, and cap wherein one of said vessel and/or cap has an inlet flow line and an output flow line;
    introducing liquid beverage into the vessel;
    latching the vessel to said agitation mechanism,
    selecting a level of carbonation;
    opening a valve to initiate the flow of carbon dioxide into said vessel and agitating the liquid beverage in said vessel utilizing the agitation mechanism;
    utilizing an orifice to slow the rate of the flow of carbon dioxide;
    monitoring the pressure in the vessel;
    adjusting the inlet valve, to an open or closed position based upon the pressure in the vessel to obtain the selected level of carbonation of the liquid beverage; and
    stopping the flow of carbon dioxide into the vessel and agitation mechanism after obtaining the desired level of carbonation.

21. The method of claim 20, wherein the orifice has an opening diameter of less than or equal to 0.05 inch.

22. The method of claim 20, wherein the orifice has an opening diameter of less than or equal to 0.03 inch.

23. A method for forming a carbonated beverage, the method comprising:
    receiving a carbonation level selected by a user;
    receiving a vessel containing a fluid to be carbonated;
    using a CPU, a valve, and a transducer to introduce a predetermined level of pressurized carbon dioxide into the vessel, wherein the predetermined level of pressurized carbon dioxide flows through an inlet orifice to control the flow rate of the pressurized carbon dioxide introduced into the vessel;
    agitating the vessel;
    using the CPU, the valve, and the transducer to maintain said predetermined level of pressurized carbon dioxide in the vessel while agitating the vessel; and
    venting the pressure from the vessel.

24. The method of claim 23, including the further step of utilizing an outlet orifice to slow the rate of carbon dioxide exiting the vessel to a level which prevents foaming of the liquid within the vessel.

25. A method for forming a carbonated beverage, the method comprising:
    receiving a carbonation level selected by a user;
    receiving a vessel containing a fluid to be carbonated;
    using a CPU, a valve, and a transducer to introduce a predetermined level of pressurized carbon dioxide into the vessel, wherein the predetermined level of pressurized carbon dioxide flows through an inlet orifice to control the flow rate of the pressurized carbon dioxide;
    agitating the vessel by using a motor to drive the vessel to a maximum upward position and then to a minimum downward position, wherein a force of at least 3 Gs acts on the fluid in the vessel when the vessel changes directions;
    using the CPU, the valve, and the transducer to maintain said predetermined level of pressurized carbon dioxide in the vessel while agitating the vessel; and
    after the step of agitating the vessel is complete, releasing carbon dioxide through an outlet orifice in an outlet tube that is in communication with the vessel.

26. A method for forming a carbonated beverage, the method comprising:
    receiving a carbonation level selected by a user;
    receiving a vessel containing a fluid to be carbonated;
    using a CPU, a valve, and a transducer to introduce a predetermined level of pressurized carbon dioxide into the vessel, wherein the predetermined level of pressurized carbon dioxide flows through an inlet orifice to control the flow rate of the pressurized carbon dioxide;
    agitating the vessel, wherein the agitation provides between 3 Gs and 6 Gs of force on the vessel;
    using the CPU, the valve, and the transducer to maintain said predetermined level of pressurized carbon dioxide in the vessel while agitating the vessel; and
    after the step of agitating the vessel is complete, releasing carbon dioxide through an outlet orifice in an outlet tube that is in communication with the vessel.

27. A method for forming a carbonated beverage, the method comprising:
    receiving a carbonation level selected by a user;
    receiving a vessel containing a fluid to be carbonated;
    using a CPU, a valve, and a transducer to introduce a predetermined level of pressurized carbon dioxide into the vessel, wherein the predetermined level of pressurized carbon dioxide flows through an inlet orifice to control the flow rate of the pressurized carbon dioxide;
    agitating the vessel, wherein the agitation provides approximately 6 Gs of force on the vessel;
    using the CPU, the valve, and the transducer to maintain said predetermined level of pressurized carbon dioxide in the vessel while agitating the vessel; and
    after the step of agitating the vessel is complete, releasing carbon dioxide through an outlet orifice in an outlet tube that is in communication with the vessel.

* * * * *

UNITED STATES PATENT AND TRADEMARK OFFICE
CERTIFICATE OF CORRECTION

| | |
|---|---|
| PATENT NO. | : 9,107,448 B2 |
| APPLICATION NO. | : 13/908847 |
| DATED | : August 18, 2015 |
| INVENTOR(S) | : Nicholas Giardino et al. |

Page 1 of 1

It is certified that error appears in the above-identified patent and that said Letters Patent is hereby corrected as shown below:

In The Claims

In claim 2, at column 8, line 17, "tune" should instead read --time--.

In claim 16, at column 8, line 61, "60" should instead read --50--.

In claim 20, at column 9, line 5, delete the "," between "providing" and "an".

In claim 20, at column 9, line 6, delete the "," between "providing" and "a".

In claim 20, at column 9, line 17, delete the "," between "valve" and "to".

Signed and Sealed this
Fifteenth Day of December, 2015

Michelle K. Lee
*Director of the United States Patent and Trademark Office*